April 10, 1928.
A. L. WARMINGTON
STEERING WHEEL
Filed April 27, 1927
1,665,337
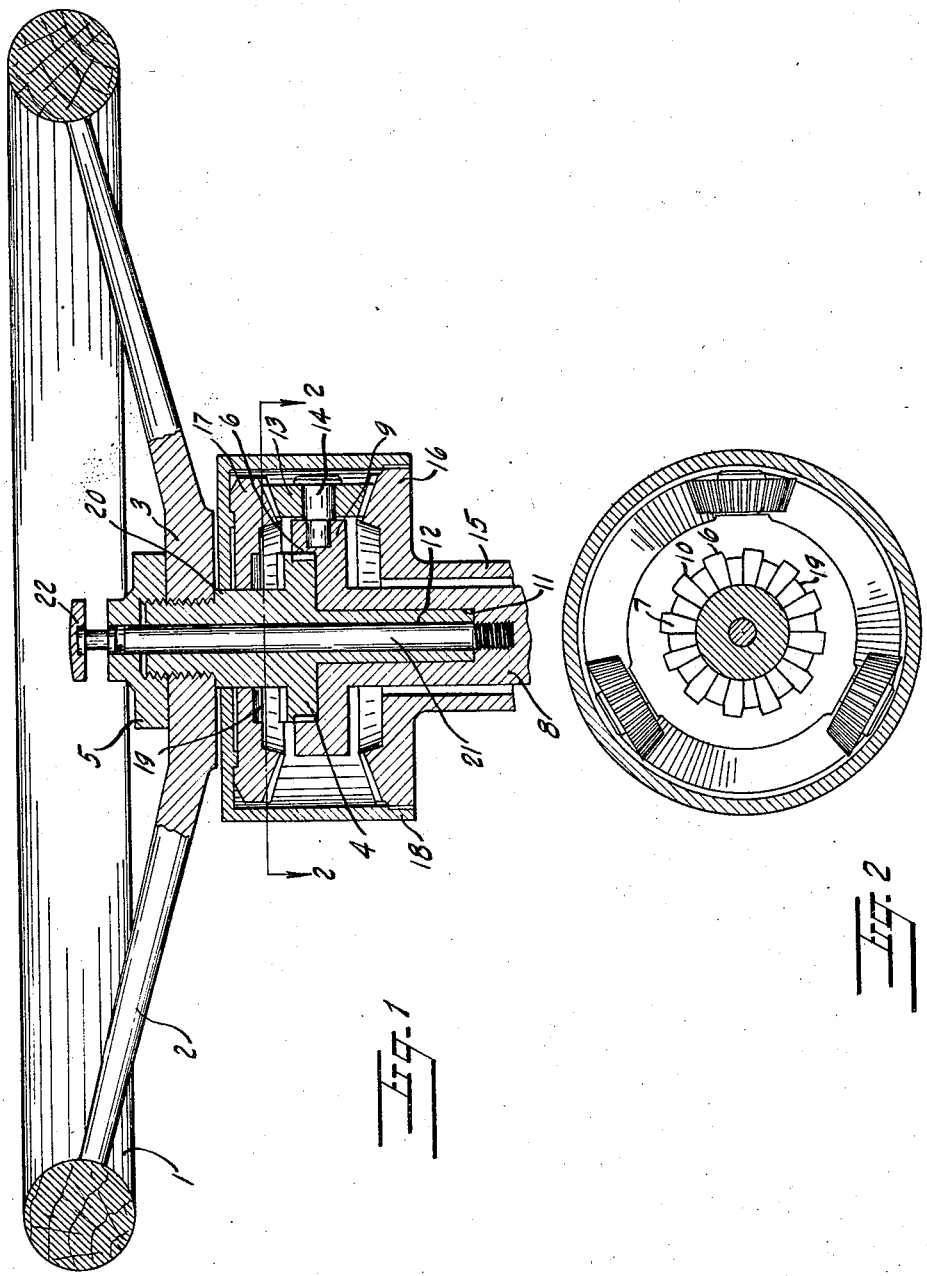
INVENTOR.
ARTHUR L. WARMINGTON
BY Harry C. Schroeder
ATTORNEY Patented Apr. 10, 1928.

1,665,337

UNITED STATES PATENT OFFICE.

ARTHUR L. WARMINGTON, OF OAKLAND, CALIFORNIA.

STEERING WHEEL.

Application filed April 27, 1927. Serial No. 186,929.

This invention relates in general to steering gears in use on vehicles, particularly to steering gears used on automobiles.

The object of the invention is to provide a device which will reduce to a minimum the effort necessary to steer the front wheels of a parked vehicle.

Another object of the invention is to provide a device for readily changing the ratio between the turning moment of the steering wheel and the turning of the front wheels of a vehicle.

A further object of the invention is to effect the adjustment of the turning moment of the steering wheel by a slight movement thereof.

With these and other objects in view, the present invention consists in the combinations and arrangements of parts, as will be hereinafter more fully described, shown in the accompanying drawings, and particularly pointed out in the appended claims, it being understood that changes may be made within the scope of the claims without departing from the spirit or sacrificing any of the advantages of the invention.

In the accompanying one sheet of drawing:

Figure 1 is a sectional view of the device shown attached to a steering wheel.

Figure 2 is a cross section taken along the line 2—2 of Figure 1.

The steering wheels in use at the present may be easily operated when the vehicle is in motion, but in some instances it is almost impossible to steer the front wheels of a vehicle when the vehicle is standing still. It is especially hard to steer the front wheels of any vehicle having balloon tires thereon. The balloon tires grip the ground more firmly than the standard sized tires on account of having a larger frictional surface. There is a great demand for a steering device, which may be adjusted to produce force enough to steer the wheels of a vehicle at a standstill employing only a minimum effort on the part of the driver.

A preferred form of the device employs a steering wheel 1 having the steering spider 2, and a hub 3 thereon. A clutch 4 is threaded into the hub 3 and is held in place by means of a lock nut 5. A gear 6, of large circular pitch and the claws 7 on the top surface thereof has a clutch function to be hereinafter described.

A steering column 8 is operatively connected at the lower end to a steering gear of any standard type not shown in the drawing. The upper end thereof being constructed in the shape of a hub 9 having an internal gear 10 cut thereon. Said internal gear 10 to be cut to the same pitch as that of the gear 6 on the clutch 4 in order to permit an operative engagement thereby.

A hole 11 extends from the hub 7 downwardly into the column 8 to slidably receive and guide the sleeve 12, said sleeve 12 being an integral part of the clutch 4.

Pinions 13 are rotatably secured to the hub 9 by means of pins 14.

A steering column jacket 15 fastened to the vehicle frame in any standard way, not shown, supports the steering mechanism. A bevel gear 16 forms the head of said jacket 15. Another bevel gear 17 is in mesh with the pinions 13 and rests thereon. A gear casing 18 is carried by said bevel gear 17 so that the clutch 4 is slidable therein. A jaw 19 is cut into the bevelled gear 17 to mesh with the claws 7 of the clutch 4. The pinions 13 and bevelled gears 16 and 17 function as a planetary reduction gearing when the clutch 4 is in engagement with the bevelled gear 17. The clutch 4 is slidable through a hole 20 centrally disposed in said gear 17 and casing 18.

In order to guide the movement of the clutch a guide rod 21 is screwed into the column 6 extending through clutch 4 and through and above the lock nut 5. A cap 22 is attached to the upper end of the rod 21 to limit the upward motion of the lock nut 5. The clearance between the lock nut 5 and cap 22 is just large enough to allow claws 17 on the clutch 4 to be elevated into engagement with the jaw 19 but to prevent any further upward movement of the clutch thereby to obviate the danger of the lifting of the bevelled gear 17 and housing 18.

The device operates as follows:

The drawing illustrates the device in the normal position when the vehicle is in motion. The gear 6 of the clutch 4 is held in engagement with the internal gear 10 by gravity. When the driver of the vehicle rotates the steering wheel 1 the clutch 4 being secured to said steering wheel rotates therewith, thereby transmitting the rotation thereof to the steering column 8. The pinions 13 and the bevelled gear 17 revolve idly with the column 8.

When the vehicle is parked and the driver intends to steer the front wheel, the steering wheel is lifted as far as the cap 22 permits, thereby disengaging the clutch 4 from the column 8 and bringing the clutch in operative relation with the bevelled gear 17. In this case the rotation of the steering wheel is transmitted to the bevelled gear 17 and the pinions 13. Said pinions 13 rotate the column 8 at a much less speed than the rotation of the steering wheel. For instance, the planetary gearing may be so designed as to effect a 2 to 1 reduction of speed. In this instance one-half revolution of the steering wheel moves the column only a quarter turn. It is understood that the device may be designed to any rate of reduction of the speed. It is evident that in the above instance the force needed to turn the column 8 to steer the front wheels through the planetary reduction gearing is approximately half of the force required to drive the column 8 directly from the steering wheel.

Having thus described my invention, what I claim as novel and desire to secure by Letters Patent is:

1. A steering device comprising a steering wheel, a clutch attached thereto, a steering column having means thereon to be engaged by said clutch, a gear attached to the stationary member of the steering device, radially protruding pinions, rotatably secured to the column, and meshing with said gear, a floating gear to mesh with said pinions and to be supported thereon, and means to alternately engage said clutch with said column and said floating gear.

2. A steering device, comprising a steering wheel, a clutch attached thereto, a steering column having means thereon to be engaged by said clutch, a gear attached to the stationary member of the steering device, radially protruding pinions rotatably secured to the column, and meshing with said gear, a floating gear in mesh with said pinions and supported thereon, a floating casing attached to said floating gear, and means to alternately engage said clutch with said column and said floating gear.

3. A steering device, comprising a steering wheel, a clutch attached thereto, a steering column having means thereon to be engaged by said clutch, a gear attached to the stationary member of the steering device, radially protruding pinions rotatably secured to the column, and meshing with said gear, a floating gear to mesh with said pinions and to be supported thereon, means to alternately engage said clutch with said column and said floating gear, and a guide secured to the column to guide said clutch and to limit the movement thereof.

In testimony whereof I affix my signature.

ARTHUR L. WARMINGTON.